United States Patent Office 2,938,047
Patented May 24, 1960

2,938,047

CARBOBENZOPHENONEOXYALKYL SILOXANES AND THEIR PREPARATION

William T. Black, White Plains, N.Y., assignor to Union Carbide Corporation, a corporation of New York No Drawing. Filed Nov. 13, 1958, Ser. No. 773,574

10 Claims. (Cl. 260—448.2)

This invention relates to novel organosiloxanes and to processes for their production. More particularly, this invention relates to organosiloxanes containing at least one silicon-bonded carbobenzophenoneoxyalkyl group and to processes for their production.

It is the object of this invention to prepare novel organosiloxanes which are useful as ultra-violet light absorbers. These organosiloxanes are particularly suitable for use as additives to polish formulations to protect the surfaces to which said polish is applied from the deleterious effects of the ultra-violet rays of sunlight.

The novel organosiloxanes of this invention are organopolysiloxanes containing at least one silicon-bonded carbobenzophenoneoxyalkyl group of the formula:

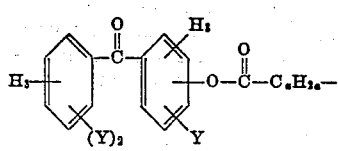

(1)

where Y represents hydrogen or alkoxy groups and need not be the same throughout the molecule, and $a$ is an integer having a value of from 2 to 10, the acid carbonyl group

of said carbobenzophenoneoxyalkyl group being interconnected to silicon of said organopolysiloxane through at least 2 carbon atoms of the alkyl group, $-C_aH_{2a}-$, of said carbobenzophenoneoxyalkyl group. The remaining valences of silicon of said organopolysiloxane other than the valences satisfied by the carbobenzophenoneoxyalkyl group and siloxane linkages are satisfied by carboxyalkyl, carbalkoxyalkyl or monovalent hydrocarbon radicals. By the terms "carboxyalkyl" and "carbalkoxyalkyl," as used herein, is meant $HOOC-C_aH_{2a}-$ and $$R'OOC-C_aH_{2a}-$$

groups, respectively, where $a$ is defined as above and $R'$ is an alkyl group such as methyl, ethyl, propyl, hexyl and the like. Examples of the alkoxy groups that are represented by Y are methoxy, ethoxy, propoxy, butoxy and the like.

The organosiloxanes of the present invention include the homopolymeric organopolysiloxanes and copolymeric organopolysiloxanes. The homopolymeric organopolysiloxanes of the present invention are those containing repeating units of the formula:

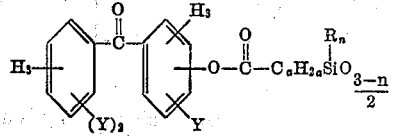

(2)

where Y and $a$ have the above-defined meanings, R is a monovalent hydrocarbon radical and need not be the same throughout the same molecule and $n$ is an integer of from 0 to 2 and need not be the same throughout the same molecule, but is the same in the same unit. Examples of the monovalent hydrocarbon radicals that are represented by R are alkyl groups such as methyl, ethyl, propyl, butyl and the like; alkenyl groups such as vinyl, allyl, butenyl, cyclohexenyl and the like; aryl groups such as phenyl, tolyl and the like and aralkyl groups such as benzyl, phenylethyl and the like. The homopolymeric organopolysiloxanes can be trifunctional (i.e. when $n=0$, difunctional (i.e. when $n=1$) or monofunctional (i.e. when $n=2$), with respect to silicon or they can consist of polymers containing combinations of the mono-, di- and trifunctional units.

The copolymeric organopolysiloxanes of the present invention are those containing, in addition to one or more units as depicted by Formula 2, one or more units of the following formulas:

$$R_bSiO_{\frac{4-b}{2}} \quad (3)$$

$$R'OOC-C_aH_{2a}\underset{R_n}{\overset{|}{Si}}O_{\frac{3-n}{2}} \quad (4)$$

and $$HOOC-C_aH_{2a}-SiO_{\frac{3-n}{2}} \quad (5)$$

wherein $a$, $n$, R and R' are as previously defined, and $b$ is an integer of from 0 to 3 and need not be the same throughout the same molecule, but is the same in the same unit. These copolymeric organopolysiloxanes include those containing at least one unit of Formula 2 with any and all combinations of the units depicted by Formulas 3, 4 and/or 5. These copolymeric organopolysiloxanes also include those which comprise a combination of such units wherein the silicon atom can be mono-, di- or trifunctional and are represented by the formula:

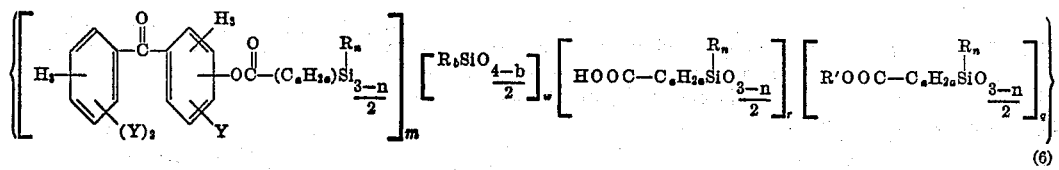

(6)

where R, R', Y, $a$, $b$ and $n$ have the above-defined meanings, $m$ is an integer having a value of at least 1, $w$, $r$ and $q$ are integers having a value of 0 or greater and need not necessarily have the same value, and the sum of $w$, $r$ and $q$ is at least 1. Thus, for example, included in Formula 6 are copolymeric organopolysiloxanes containing difunctional units of Formula 2, with mono-, and difunctional units of Formula 3, i.e. copolymers of the formula:

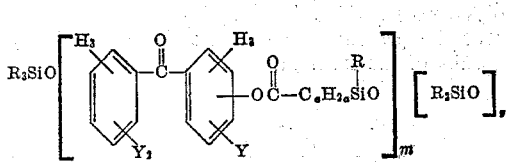

where R, Y and $m$ are defined as above and $y$ is an integer of at least 1; copolymeric organopolysiloxanes containing difunctional units of Formula 2, with mono- and difunctional units of Formula 3 and difunctional units of Formula 4, i.e. copolymeric organopolysiloxanes of the formula:

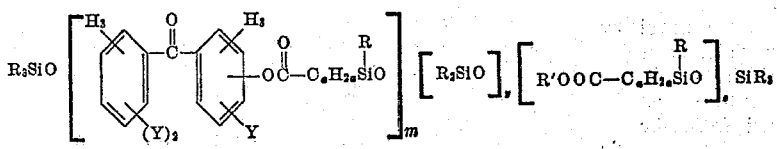

where R, R', Y, $m$ and $y$ have the above-defined meanings and $z$ is an integer of at least 1; and copolymeric organopolysiloxanes containing difunctional units of Formula 2, with mono- and difunctional units of Formula 3 and difunctional units of Formulas 4 and 5, i.e. copolymeric organopolysiloxanes of the formula:

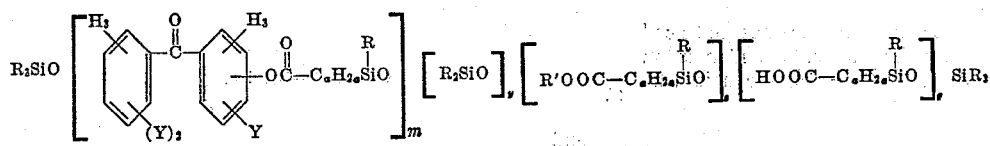

where R, R', $a$, $x$, $m$, $y$ and $z$ have the above-defined meaning, and $g$ is an integer of at least 1.

The novel organosiloxanes of my invention are produced by the process which involves adding an organosilicon compound containing at least one unit of the formula:

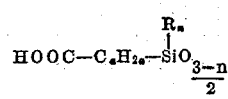

where R, $a$ and $n$ have the above-defined meaning, to trifluoroacetic anhydride at room temperature to form a mixture and adding to this mixture, a hydroxy benzophenone of the formula:

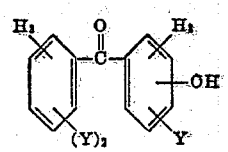

where Y has the above-defined meanings. The resultant mixture is heated to a temperature sufficiently elevated to cause the hydroxy group of the benzophenone and the carboxyalkyl group of the organosilicon compound to react to produce the carbobenzophenoneoxyalkyl group and as a by-product, trifluoroacetic acid. The temperature at which the process is carried out is not narrowly critical and can be from 50° C. to 150° C.; however, I prefer that the process be carried out at a temperature of from 80° C. to about 120° C.

It is believed that the reaction that occurs involves the reaction of one carboxyalkyl group of the organosilicon compound with one trifluoroacetic anhydride molecule to form a mixed anhydride group of trifluoroacetic acid and the carboxyalkyl group of the organosilicon compound. One mole of the mixed anhydride group then reacts with one mole of the hydroxybenzophenone to yield the silicon-bonded carbobenzophenoneoxyalkyl group. Regardless of particular reaction mechanism, the overall reaction is shown in the following equation showing that one hydroxybenzophenone molecule and one silicon-bonded carboxyalkyl group of an organosilicon compound produce one silicon-bonded carbobenzophenoneoxyalkyl group:

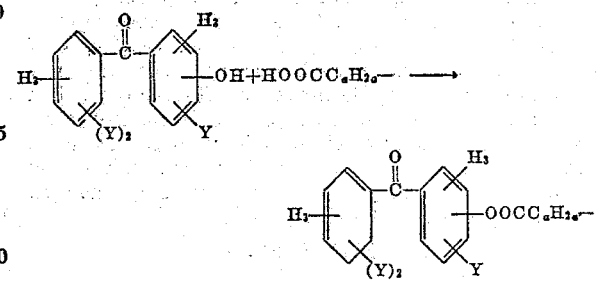

wherein Y and $a$ have the previously defined meanings, $HOOCC_aH_{2a}$— represents the silicon-bonded carboxyalkyl group and

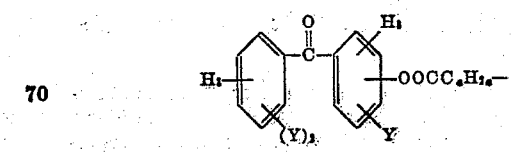

represents the silicon-bonded carbobenzophenoneoxyalkyl group.

Although the relative amounts of the organosilicon compound and the trifluoroacetic anhydride employed are not narrowly critical, it is preferred to employ about 1.1 times the stoichiometric amount of trifluoroacetic anhydride (i.e. one mole of trifluoroacetic anhydride for each mole of the carboxyalkyl group) in order to ensure complete reaction. By employing less than a stoichiometric amount of trifluoroacetic anhydride, the organosiloxanes of this invention which contain both silicon-bonded carbobenzophenoneoxyalkyl and carboxyalkyl groups are produced. The amounts of the hydroxybenzophenone and the carboxyalkylsilicon compound employed are not narrowly critical. If it is desired to produce an organosiloxane wherein there are no silicon-bonded carboxyalkyl or carbalkoxyalkyl groups, it is preferred to employ in the reaction about 1.1 moles of trifluoroacetic anhydride and 1.1 moles of the hydroxybenzophenone for each mole of the carboxyalkyl group of the organosilicon compound. The organosiloxanes of this invention which contain in addition to the silicon-bonded carbobenzophenoneoxyalkyl group, silicon-bonded carbalkoxyalkyl and carboxyalkyl groups are produced by employing in the reaction less than one mole of the hydroxybenzophenone for each mole of the carboxyalkyl group and then treating the reaction mixture with an amount of an alkanol insufficient to react with the remaining carboxyalkyl groups (i.e., according to the theory set forth above, the remaining carboxyalkyltrifluoroacetic acid mixed anhydride) and then treating the total reaction mixture with water. Organosiloxanes which contain in addition to the silicon-bonded carbobenzophenoneoxyalkyl group, silicon-bonded carbalkoxy or carboxyalkyl groups are produced by employing in the reaction less than one mole of the hydroxybenzophenone for each mole of the carboxyalkyl group and then treating the reaction mixture with an excess of an alkanol or water, respectively.

A solvent is not necessary in order to produce the compositions of this invention according to the above process; however, a solvent may be used, if desired. Solvents that can be used are those solvents which are inert toward the reactants used, and in which said reactants are soluble. Such solvents are, for example, the dialkyl ethers of ethylene glycol, the dialkyl ether of polyethylene glycols and the like.

The organosilicon compounds useful as starting materials in the production of the compositions of the instant invention are those containing at least one unit of the formula:

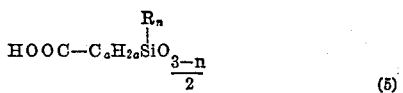

where $a$ and $n$ have the above-defined meanings and the silicon atom is interconnected to the carboxy group through at least two carbon atoms. The organosilicon compounds useful as starting materials in the process of this invention include homopolymeric organosilicon compounds and copolymeric organosilicon compounds.

The homopolymeric organosilicon compounds useful as starting materials in the process of my invention are those containing units of Formula 5 and can be trifunctional with respect to silicon (i.e. where $n=0$), examples of such trifunctional organosilicon compounds are beta-carboxyethylpolysiloxane, beta-carboxypropylsiloxane, gamma-carboxypropylpolysiloxane, omega-carboxydecylpolysiloxane and the like. These homopolymeric starting materials can be difunctional with respect to silicon (i.e. where $n=1$) and can be cyclic in form having from 3 to 7 such units or they can be linear having any number of such units. For example, such cyclic organosilicon compounds are tetra-(gamma-carboxypropyl)tetramethylcyclotetrasiloxane, tri-(beta-carboxypropyl)triethylcyclotrisiloxane, tetra-(beta-carboxyethyl)-tetraphenylcyclotetrasiloxane and the like; such linear organosilicon compounds are the disiloxanes and oils, for example, gamma-carboxypropylethylpolysiloxane oils, beta-carboxypropylphenylpolysiloxane oils, beta-carboxyethylmethylpolysiloxane oils and the like. The homopolymeric organosilicon starting materials also include those which are monofunctional with respect to silicon (i.e. where $n=2$) such as, for example, bis(gamma-carboxypropyl)dimethyldisiloxane; bis(beta-carboxypropyl)diphenyldisiloxane and the like, or they can consist of polymers containing combinations of mono-, di- and trifunctional units.

The copolymeric organosilicon compounds useful as starting materials in the process of my invention are those containing, in addition to one or more units as depicted by Formula 5, one or more units of Formulas 3 and/or 4. These copolymeric organosilicon compounds also include those which comprise a combination of such units wherein the silicon atom can be mono-, di- or trifunctional and are represented by the formula:

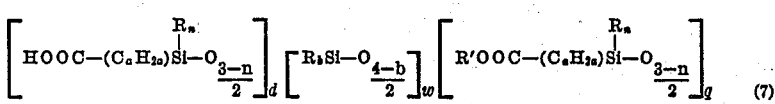

wherein R, R', $a$, $b$, $w$ and $q$ have the above-defined meanings and $d$ is an integer of at least one and $n$ need not have the same value throughout the molecule within its meaning as described above, but it must have the same value throughout the same unit. Thus, for example, included in Formula 7 are copolymeric organosilicon compounds containing difunctional units of Formula 5, with mono- and difunctional units of Formula 3, i.e. copolymers of the formula:

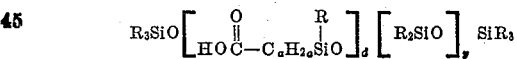

where R, $a$, $d$ and $y$ are defined as above; copolymeric organosilicon compounds containing difunctional units of Formula 5, with mono- and difunctional units of Formula 3 and difunctional units of Formula 4, i.e. copolymeric organosilicon compounds of the formula:

where R, R', $a$, $d$, $y$ and $z$ have the above-defined meanings.

Illustrative of the hydroxy benzophenones employed as starting materials for the process of this invention are, 2-hydroxy-4-methoxybenzophenone, 3-hydroxy-4-methoxybenzophenone, 2-hydroxy-3',4,4'-trimethoxybenzophenone, 2-hydroxy-5-methoxybenzophenone and the like.

The organosiloxanes of this invention can also be produced by an alternate process as follows:

The organosilicon compound as described above that contains at least one unit of the formula

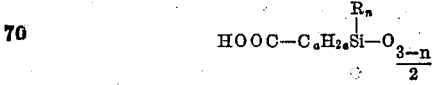

where R, $a$ and $n$ have the above-defined meaning, is treated with a thionyl halide such as, thionyl chloride, or thionyl bromide, at a temperature of between $-25°$ C.

and 25° C. to convert the carboxy group, HOOC—, of said organosilicon compound into an acid halide group,

where X represents a halogen atom, thereby forming an organosilicon compound containing a silicon-bonded acid halide-alkyl group. The organosilicon compound containing the silicon-bonded acid halide-alkyl group thus obtained is treated with a mixture of a hydroxy benzophenone in a tertiary amine and the mixture maintained at a temperature at which the acid halide group and hydroxybenzophenone react to produce the organosiloxanes of this invention. This reaction is illustrated by the following equations which show the reaction of a silicon-bonded carboxyalkyl group, —C$_a$H$_{2a}$COOH, where $a$ is as above defined, with a thionyl halide to yield the silicon-bonded acid halide alkyl group,

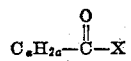

where $a$ and X are as above defined, said acid halide alkyl group then reacting with a hydroxy benzophenone in the presence of a tertiary amine (pyridine) to yield the silicon-bonded carbobenzophenoneoxyalkyl group:

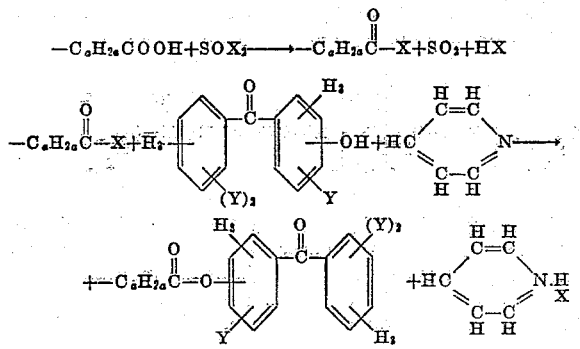

where X, Y and $a$ have the above-defined meanings.

The amount of the thionyl halide employed is not narrowly critical; however, I prefer to employ stoichiometric amounts of the thionyl halide (i.e. one mole of the thionyl halide for each mole of the carboxyalkyl group desired to be converted to the acid halide group) so as to minimize the possibility of side reactions. The temperature employed in the reaction of the carboxyalkyl group of the organosilicon compound and the thionyl halide is not narrowly critical; however, I prefer to employ temperatures from about —25° C. to 25° C. to minimize the possibility of side reactions.

The tertiary amine is employed in this alternate process to react with the liberated hydrogen halide, thus preventing undesirable side reactions. The amount of the tertiary amine used in the alternative process of this invention is not narrowly critical and can be from 0.1 to 2.0 moles of the tertiary amine or even higher for each mole of the acid halide group present in the reaction mixture. It is preferred to employ at least 1.0 mole of the tertiary amine for each mole of the acid halide group present in the reaction mixture in order to get a rapid and complete reaction. By the term tertiary amine, as used herein, is meant the aliphatic tertiary amines such as triethylamine, tri-n-butylamine and the like; and the heterocyclic amines having a tertiary amino nitrogen such as pyridine, quinoline and the like.

The relative amounts of the hydroxy benzophenone and the organosilicon compound containing the silicon-bonded acid halide alkyl group

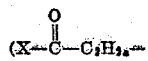

where X and $a$ are as previously described), employed in the alternate process, are not narrowly critical and can be from 0.1 to 2.0 moles of the hydroxy benzophenone for each mole of the acid halide alkyl group present in the organosilicon compound. It is preferred that slightly more than 1 mole of the hydroxy benzophenone be used for each mole of the acid halide alkyl group present in the organosilicon compound in order to ensure complete reaction. Where less than 1 mole of the hydroxy benzophenone is used for each mole of the acid halide alkyl group present, an amount of an alkanol sufficient to react with the remaining acid halide alkyl group can be added, thus producing a copolymer having silicon-bonded carbalkoxy alkyl groups in addition to carbobenzophenoneoxyalkyl groups or an amount of an alkanol less than that required to react with the remaining acid halide alkyl groups can be added and water added to the resultant material to hydrolyze the remaining acid halide alkyl groups, thus giving the copolymeric organopolysiloxanes of this invention containing silicon-bonded carbalkoxyalkyl- and carboxyalkyl- groups in addition to the carbobenzophenoneoxyalkyl groups or water can be added thus producing copolymeric organopolysiloxanes containing both silicon-bonded carbobenzophenoneoxyalkyl and carboxyalkyl groups.

A solvent is not necessary to the production of the compositions of this invention according to the alternative process; however, a solvent may be used, as desired. Solvents that are useful are those solvents in which the reactants are soluble and are inert to the reactants. Such solvents are, for example, benzene, toluene and the like; the dialkyl ethers of ethylene glycol and polyethylene glycol and the like. Of course, an excess of the tertiary amine can be used so as to additionally function as a solvent.

The temperature at which the reaction between the acid halide group and the hydroxy benzophenone is carried out is not narrowly critical and can vary from 25° C. to 200° C.; however, I prefer to carry out the reaction at temperatures between 25° C. and 150° C.

The homopolymeric organosilicon compounds employed as starting materials in the processes of this invention are prepared by the hydrolysis and condensation of the carbalkoxy-alkylalkoxysilanes. Such carbalkoxy alkylalkoxysilanes are described and claimed as new compositions of matter in copending patent applications Serial Nos. 615,468, 615,492, 615,498 and 615,499, all filed October 12, 1956, and application 627,122, filed December 10, 1956. The copolymeric organosilicon compounds employed as starting materials are advantageously prepared by the acidic equilibration of carboxyalkylsilicon compound containing units of Formula 5, with silicon compounds containing units of Formula 3, and/or silicon compounds containing units of Formula 4, by techniques known to those skilled in the art.

The novel organosiloxanes produced by the process of my invention are useful in many applications as ultraviolet light absorbing compounds. Thus, they can be added to waxes for application to the paint finishes of various articles to protect said finishes from the deteriorating action of sunlight. For example, my compositions can be added to automobile polishes which, when applied to the finishes of automobiles, protect said automobile finishes from the deleterious effects of sunlight.

The following examples serve to further illustrate my invention:

Example I

A dimethylpolysiloxane oil (20 g.) having the average formula:

was charged into a 100 cc. round-bottomed flask. Trifluoroacetic anhydride (7.0 g.) was added and the mixture shaken and allowed to stand for 1 hour at room temperature. 2-hydroxy-4-methoxybenzophenone (9.0 g.) was added to the mixture and the materials heated to 100° C. for 12 hours. After cooling to room temperature, the mixture was stripped under reduced pressure to remove the excess trifluoroacetic anhydride. The materials were then poured into a water-ice mixture. The oily layer was extracted with petroleum ether and washed with distilled water until the water washings were neutral to litmus paper. The petroleum ether was removed by vacuum stripping. The residue was a water-white oil.

The water-white oil was redissolved in petroleum ether and filtered. The petroleum ether was removed by vacuum evaporation and the residue filtered through a fritted filter covered with a diatomaceous earth filter aid. A clear, water-white oil was obtained. Infrared analysis showed the oil to be a linear dimethylpolysiloxane oil containing units having the formula:

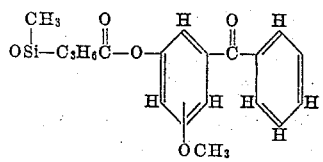

and $(CH_3)_2SiO$, i.e. an oil of the general formula:

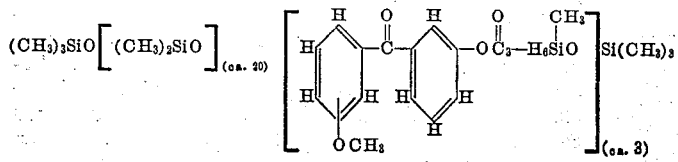

This oil was found to absorb ultraviolet light having wave lengths of from 2200 A. to 3700 A.

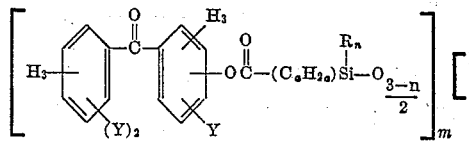

Example II

A 2000 molecular weight dimethylpolysiloxane oil having the average formula:

was treated with an excess of thionyl chloride at room temperature to form the acid chloride. The excess thionyl chloride was removed by vacuum stripping.

The oil (20 g.), as prepared above, containing silicon-bonded acid chloride alkyl units, was dissolved in 25 cc. of toluene and added to a solution of 2-hydroxy-4-methoxybenzophenone (4.56 g.) in pyridine (7.8 g.). The mixture was shaken and allowed to stand at room temperature for 24 hours. Ethanol (10 cc.) was added and the mixture stirred and heated to 100° C. for 1 hour. The volatile materials were then removed by vacuum evaporation at 100° C. The oily residue was dissolved in diethyl ether and washed with a 10% hydrochloric acid solution to remove any residual pyridine. The ether solution was then washed with distilled water until the water washings were neutral to litmus paper. The ether was then evaporated off and the oil filtered to remove the solids. The solids were washed with petroleum ether and the washings combined with the filtrate. The petroleum ether was then removed by vacuum evaporation. A light brown colored oil was recovered.

The oil was analyzed by infrared and was shown to be a linear dimethylpolysiloxane oil containing:

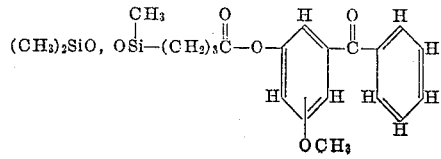

and

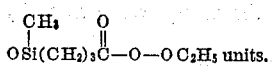

units.

This oil was found to absorb ultraviolet light having a wave length from 2200 A. to 3700 A.

What is claimed is:

1. An organosiloxane containing at least one silicon atom having one carbobenzophenoneoxyalkyl group attached to silicon through a silicon-carbon linkage, said carbobenzophenoneoxy group having the formula:

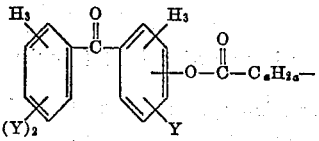

where Y is a member of the group consisting of hydrogen atoms and alkoxy groups and $a$ is an integer of from 2 to 10, said organosiloxane being an organopolysiloxane having all of the valences of silicon other than the valences satisfied by said carbobenzophenoneoxyalkyl group and by siloxane linkages, satisfied by a member of the group consisting of monovalent hydrocarbon radicals, carboxyalkyl groups and carbalkoxyalkyl groups.

2. A copolymeric organosiloxane of the formula:

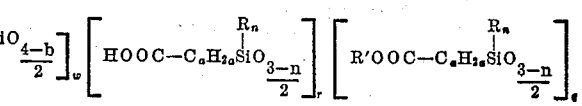

wherein R is a monovalent hydrocarbon radical, R' is an alkyl group, Y is a member of the group consisting of hydrogen atoms and alkoxy groups; $a$ is an integer of from 2 to 10; $b$ is an integer of from 0 to 3, $n$ is an integer of from 0 to 2, $m$ is an integer of at least 1, $w$ is an integer, $q$ is an integer, $r$ is an integer and the sum of $w$, $q$ and $r$ is at least 1.

3. A copolymeric organosiloxane of the formula:

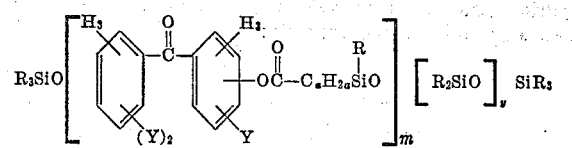

wherein R is a monovalent hydrocarbon radical, Y is a member of the group consisting of hydrogen and alkoxy groups, $a$ is an integer of from 2 to 10, $m$ is an integer of at least 1 and $y$ is an integer of at least 1.

4. A copolymeric organosiloxane of the formula:

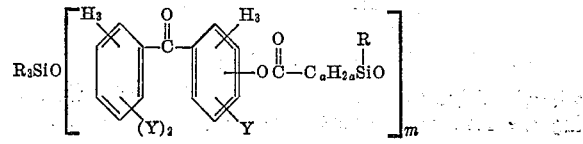

wherein R is a monovalent hydrocarbon radical, R' is an alkyl group, Y is a member of the group consisting of hydrogen, and alkoxy groups, $a$ is an integer of from 2 to 10, $y$ is an integer of at least 1, $m$ is an integer of at least 1 and $z$ is an integer of at least 1.

5. The copolymeric organosiloxanes as claimed in claim 3 wherein the groups represented by R are methyl groups.

6. The copolymeric organosiloxane as claimed in claim 4 wherein R is a methyl group and R' is an ethyl group.

7. A copolymeric organosiloxane of the formula:

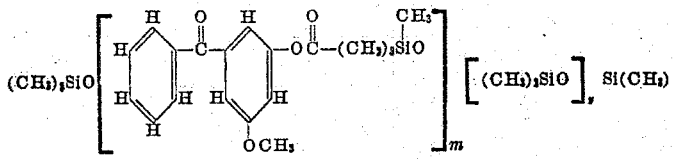

wherein $m$ is an integer of at least 1 and $y$ is an integer of at least 1.

8. A copolymeric organosiloxane of the formula:

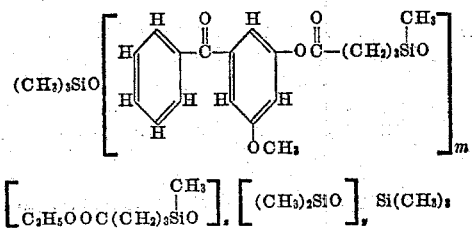

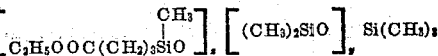

wherein $m$, $y$ and $z$ are integers having a value of at least 1.

9. A process for producing organosiloxanes containing at least one silicon atom having one carbobenzophenoneoxyalkyl group attached to silicon through a silicon-carbon linkage, said carbobenzophenoneoxyalkyl group having the formula:

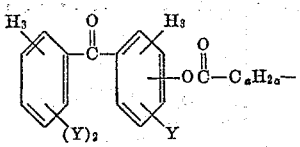

where Y is a member of the group consisting of hydrogen atoms, and alkoxy groups and $a$ is an integer of from 2 to 10, said organosiloxane being an organopolysiloxane having all of the valences of silicon, other than the valences satisfied by said carbobenzophenoneoxyalkyl group and by siloxane linkages, satisfied by a member of the group consisting of monovalent hydrocarbon radicals, carboxyalkyl group and carbalkoxyalkyl groups, which comprises (1) forming a mixture of trifluoroacetic anhydride and an organosilicon compound containing at least one unit of the formula:

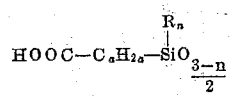

where $a$ has the above-defined meaning, R is a monovalent hydrocarbon radical and $n$ is an integer of from 0 to 2, and (2) adding to said mixture a hydroxy benzophenone of the formula:

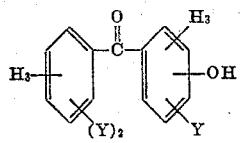

wherein Y has the above-defined meaning and maintaining the resultant mixture at a temperature sufficiently elevated to cause said carboxyalkyl group of the organosilicon compound and said hydroxy benzophenone to react to produce said organosiloxanes.

10. A process for producing organosiloxanes containing at least one silicon atom having one carbobenzophenone oxyalkyl group attached to silicon through a silicon-carbon linkage, said benzophenoneoxyalkyl group having the formula:

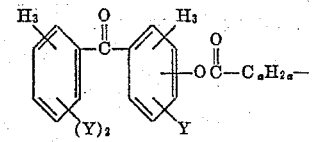

wherein Y is a member of the group consisting of hydrogen atoms and alkoxy groups and $a$ is an integer of from 2 to 10, said organosiloxane being an organopolysiloxane having all of the valences of silicon, other than the valences satisfied by said carbobenzophenoneoxyalkyl group and by siloxane linkages, satisfied by a member of the group consisting of monovalent hydrocarbon radicals, carboxyalkyl groups and carbalkoxyalkyl groups, which comprises treating an organosilicon compound containing at least one carboxyalkyl group of the formula:

$$HOOC-C_aH_{2a}-SiO_{\frac{3-n}{2}}^{R_n}$$

wherein $a$ has the above-defined meaning, R is a monovalent hydrocarbon radical, and $n$ is an integer of from 0 to 2, with a thionyl halide selected from the class consisting of thionyl chloride and thionyl bromide and maintaining the mixture of said organosilicon compound and said thionyl halide at a temperature of from $-25°$ C. to 25° C. to cause the carboxyalkyl group of the organosilicon compound to react with said thionyl halide to produce an acid halide group and then adding to said acid halide a hydroxy benzophenone of the formula:

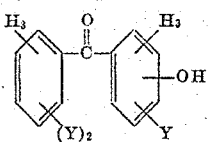

wherein Y has the above-defined meaning, in the presence of a hydrogen halide acceptor, and maintaining the resultant mixture at a temperature sufficiently elevated to cause said acid halide group and said hydroxy benzophenone to react to produce said carbobenzophenoneoxyalkyl group.

References Cited in the file of this patent
UNITED STATES PATENTS 2,723,987    Speier _____ Nov. 15, 1955

FOREIGN PATENTS 1,153,312    France _____ Sept. 30, 1957

UNITED STATES PATENT OFFICE
CERTIFICATION OF CORRECTION

Patent No. 2,938,047  May 24, 1960

William T. Black

It is hereby certified that error appears in the above numbered patent requiring correction and that the said Letters Patent should read as corrected below.

Column 6, line 13, for "alco" read -- also --; column 9, lines 26 to 28, for that portion of the formula reading

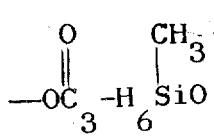   read   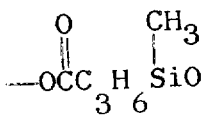

column 11, line 9, right-hand portion of the formula, for

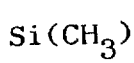   read   

Signed and sealed this 12th day of September 1961.

(SEAL)
Attest:
ERNEST W. SWIDER
Attesting Officer

DAVID L. LADD
Commissioner of Patents